US006128097A

United States Patent [19]

Parker et al.

[11] Patent Number: 6,128,097

[45] Date of Patent: Oct. 3, 2000

[54] APPARATUS, SYSTEM AND METHOD FOR CALIBRATING THE LONGITUDINAL ACCURACY OF PRINTERS

[75] Inventors: Judson F. Parker, Round Rock; Lee B. Metrick, Austin; John T. Morris, Round Rock, all of Tex.

[73] Assignee: Schlumberger Technology Corporation, Tex.

[21] Appl. No.: 08/769,258

[22] Filed: Dec. 18, 1996

[51] Int. Cl.[7] ..................... G06F 15/00

[52] U.S. Cl. ..................... 358/1.2; 358/1.3; 358/1.9; 347/19; 364/422; 367/25

[58] Field of Search ..................... 395/102, 105, 395/117, 109; 358/406, 504; 347/5, 14, 16, 19; 400/74, 279; 364/422; 367/25

[56] References Cited

U.S. PATENT DOCUMENTS

| | | | |
|---|---|---|---|
| 4,310,887 | 1/1982 | Suau | 340/854.1 |
| 4,699,531 | 10/1987 | Ulinski, Sr. et al. | 400/74 |
| 4,878,063 | 10/1989 | Katerberg | 347/19 |
| 5,109,478 | 4/1992 | Jung | 395/112 |
| 5,237,539 | 8/1993 | Selman | 367/69 |
| 5,271,096 | 12/1993 | Cook | 395/109 |
| 5,371,842 | 12/1994 | Easton et al. | 345/440 |
| 5,402,224 | 3/1995 | Hirukawa et al. | 356/124 |
| 5,434,956 | 7/1995 | Son et al. | 395/105 |
| 5,435,659 | 7/1995 | Ueno | 400/615.2 |
| 5,451,990 | 9/1995 | Sorenson et al. | 347/19 |
| 5,453,846 | 9/1995 | Tsao et al. | 358/448 |
| 5,712,707 | 1/1998 | Ausschnitt et al. | 356/401 |
| 5,815,187 | 9/1998 | Ross, Jr. | 347/131 |
| 5,825,378 | 10/1998 | Beauchamp | 347/19 |
| 5,831,658 | 11/1998 | Iga et al. | 347/171 |

*Primary Examiner*—Edward L. Coles
*Assistant Examiner*—Joseph R. Pokrzywa
*Attorney, Agent, or Firm*—Danita J. M. Maseles; Pehr B. Jansson

[57] ABSTRACT

A method, system and apparatus for calibrating the longitudinal accuracy of marking devices by using a comparison of a pattern printed on the transverse scale to a pattern printed on the longitudinal scale to calibrate the longitudinal scale is disclosed. The marking device could be a strip chart recorder, a printer, a well log printer or any other marking device for which one scale is less subject to variations or error than another. The information used for the calibration may be retained for re-use.

26 Claims, 11 Drawing Sheets

APPARATUS, SYSTEM AND METHOD FOR CALIBRATING THE LONGITUDINAL ACCURACY OF PRINTERS

TECHNICAL FIELD

This invention relates in general to the field of calibrating marking devices, such as strip chart recorders and printers, and more particularly to an improved apparatus, system and method for calibrating the longitudinal accuracy of printers, especially for printers used to print well logs in the oil and gas industry.

BACKGROUND OF THE INVENTION

In industry, marking devices such as strip chart recorders, metering chart recorders and printers are used to record various physical properties over time, depth or other indices. One such industry is the oil and gas industry. In wireline well logging, one or more tools are connected to a power and data transmission cable or "wireline" and lowered into the well borehole to obtain measurements of geophysical properties for the area surrounding the borehole. The wireline supports the tools as they are lowered into the borehole, supplies power to the tools and provides a communication medium to send signals to the tools and receive data from the tools. Data from the tools is directed by the wireline to data acquisition and processing equipment at the surface. The data acquisition and processing equipment compiles the data from the tools into a "log," a plot which presents the geophysical information concerning the formations encountered by the well, frequently by depth. U.S. Pat. No. 5,051,962 (incorporated by reference) describes such a well logging system controlled by a general purpose computer programmed for real time operation. The log is translated from analog or digital readings into physical form by a marking device such as a printer. Examples of such printers include Schlumberger's proprietary TGRP, CGRP and CIDP models, as well as commercially available models such as Printex model 820 DL and Gulton model 295. Logs can also be used to evaluate current production or to inspect the integrity of production equipment in a producing well. In any case, the information gathered during the logging operation is generally presented on the log by depth, but may also be presented by time, or any other index by which multiple physical entries are recorded.

Professionals in the industry such as geologists and geophysicists, often use these logs to update their understanding of the producing formations and geology. Standard practice is to compare logs from different wells by analyzing them side by side to assess at what depths each well encountered particular formations and how the formations differ from well to well. This comparison may be accomplished by visually comparing the printed logs side by side. It is therefore important to maintain an accurate depth scale, which lies along the longitudinal or "long" axis of the log, so that comparisons between wells can readily be made. While the transverse scale is relatively short, typically less than a foot, the longitudinal scale in a log for a deep well may be over twenty feet long. Other important comparisons may include time variations of information on the same well or comparing the logging curves on the same well which measure different geological characteristics.

The print medium is commonly some type of paper or film. The supply of print medium may be in the form of rolls, fan folds or any convenient configuration. Since the medium on which the log is printed is typically advanced by a paper transport system with rollers within a printer, the thickness of the medium can affect how far the printer advances the medium for a given angular rotation of the roller(s). This will affect whether the longitudinal scale of the log is printed accurately, i.e., to the proper physical scale. Even variation in the moisture content of paper media can produce significant variation in the longitudinal scale. In most printers, the transverse scale is not subject to these variations, because the printing heads either are fixed or are otherwise constrained. In addition, a paper transport system that uses sprocket gears instead of rollers and media with sprocket holes is not subject to these variations, at least not to any great extent.

English (non-metric) depth scales commonly used in the industry include one (1) inch of log per hundred feet of well depth (a "one inch log") and five (5) inches per hundred feet of well depth (a "five inch log"). While attempting to print a five inch log, printer and media variations may instead result in a log with a scale printed as if it were five and one-sixteenth inches per hundred feet. The numerical depths printed will be correct with respect to the depths of the formations encountered, but comparisons with other logs will be difficult to make. Wells are typically logged from the total depth up to the bottom of the deepest casing installed in the well. As an example, if casing is set at a depth of 5000 feet in a 10,000 foot well, the log incorrectly printed with a five and one-sixteenth inch scale would be "off" by 3.125 inches or the equivalent of over 62 feet by the time it reached the casing, when compared to a neighboring well with a properly printed five inch log. And a 300 foot long formation in the improperly printed log would appear as if it were over 318 feet long, when compared to formations shown in the properly printed log.

If an industry professional is attempting to compare two logs, the longitudinal scales of which are equally but antithetically inaccurate, the difficulty is compounded. If the five and one-sixteenth log is being compared, for instance, to a log which was improperly printed with 100 feet to every four and fifteen-sixteenths inches of log, a 300 foot long formation in the five and one-sixteenth inch log will appear like a 337 foot long formation in the four and fifteen-sixteenth log.

Some markers, strip chart recorders and printers have ways of compensating for such variations in their hardware, but others do not. The hardware compensation methods vary from printer to printer and use of these methods can be very time consuming. For example, the TGRP model printer uses a thumbwheel for incremental corrections. The Gulton model 295 uses a complicated procedure involving binary fractions and dual in-line package ("DIP") switches. The CIDP model has no way to compensate for media variations. Most methods also require the need for external standards for calibration, such as a ruler. Wellsites are frequently remote and usually relatively isolated. The need for an external standard can be inconvenient when logging at wellsites where such a standard may easily be misplaced or lost and replacement may be difficult or even impossible to accomplish in a timely manner. Also, if one determined a way to compensate for variations in a particular printer and/or media, it would be useful to retain that information for future use.

Therefore, a need has arisen for a convenient and uniform longitudinal axis calibration procedure which is applicable to all marking devices, such as strip chart recorders, metering chart recorders and printers. A further need exists for a calibration procedure which can be used with all types of print media. A further need exists for a calibration procedure which does not require an external standard. A further need exists to retain calibration information for future use.

SUMMARY OF THE INVENTION

In accordance with the present invention, an apparatus, a system and a method for calibrating the longitudinal accuracy of marking devices are provided that substantially eliminate or reduce the disadvantages and problems associated with the previously developed calibration tools.

The present invention provides for a method, system and apparatus for calibrating the longitudinal accuracy of marking devices by using a comparison of a pattern printed in the transverse direction to a pattern printed in the longitudinal direction to calibrate the longitudinal scale. The marking device could be a strip chart recorder, a printer, a well log printer or any other marking device where one scale or printing axis is less subject to variation than another. For example, the transverse scale of a marker may be subject to less variation or error than its longitudinal scale or the reverse may be true. The comparison may be done visually to determine a measured value. The longitudinal scale may be adjusted by inputting the measured value into a calibration program, determining a compensation factor by taking the ratio of the measured value to an expected value, determining an adjusted resolution by multiplying the nominal resolution by the compensation factor; and formatting the well log using the adjusted resolution, which will yield an adjusted longitudinal scale.

The present invention provides for a method for calibrating the longitudinal accuracy of marking devices which includes comparing a first pattern printed in a transverse direction to a second pattern printed in a longitudinal direction, and adjusting the longitudinal scale in response to the comparison. The marking device could be a strip chart recorder, a printer, a well log printer or any other marking device. The comparison may be done visually to determine a measured value. The longitudinal scale may be adjusted by inputting the measured value into a calibration program, determining a compensation factor by taking the ratio of the measured value to an expected value, determining an adjusted resolution by multiplying the nominal resolution by the compensation factor; and formatting the well log using the adjusted resolution, which will yield an adjusted longitudinal scale.

The present invention also provides for a method for calibrating the longitudinal accuracy of marking devices which includes determining a compensation factor by comparing a first pattern printed in a transverse direction to a second pattern printed in a longitudinal direction, and adjusting the longitudinal scale using the compensation factor. The marking device could be a strip chart recorder, a printer, a well log printer or any other marking device. The comparison can be done visually to determine a measured value. The longitudinal scale may be adjusted by inputting the measured value into a calibration program, determining a compensation factor by taking the ratio of the measured value to an expected value, determining an adjusted resolution by multiplying the nominal resolution by the compensation factor; and formatting the well log using the adjusted resolution, which will yield an adjusted longitudinal scale. The adjusted resolution may be saved for reuse.

The present invention also provides for a method for calibrating the longitudinal accuracy of a well log printer having a nominal resolution which includes printing a first pattern in a transverse direction of a well log, printing a second pattern having a numerical pattern in a longitudinal direction of the well log, determining a measured value by comparing the first pattern to the second pattern, and adjusting the longitudinal scale using the compensation factor. The comparison may be performed visually. More specifically, the adjusting step may include inputting the measured value into a calibration program, determining by the calibration program a compensation factor by taking the ratio of the measured value to an expected value, determining by the calibration program an adjusted resolution by multiplying the nominal resolution by the compensation factor, and formatting the well log using the adjusted resolution, yielding an adjusted longitudinal scale. Alternatively, the adjusting step may include inputting the measured value into a data processing system having memory, using a first software in the memory to compute the compensation factor by taking the ratio of the measured value to an expected value, using the first software to adjust the nominal resolution of the printer by the compensation factor, and inputting the adjusted resolution into a second software to adjust the longitudinal scale of the well log. The adjusted resolution may be saved for reuse.

The present invention also provides for a method for calibrating longitudinal accuracy of well log printers having a nominal resolution which includes printing a first pattern in a transverse direction of a well log, printing a second pattern in a longitudinal direction of the well log, overlaying the first pattern with the second pattern to determine a measured value, and adjusting the longitudinal scale using the measured value. More specifically, the step of adjusting the longitudinal scale using the compensation factor may include inputting the measured value into a data acquisition and processing system, with a memory; the memory having a rendering program and a calibration program, determining an adjusted resolution by the calibration program taking the ratio of the measured value to an expected value and multiplying by the nominal resolution, rendering the well log with the adjusted resolution by the rendering program, yielding an adjusted longitudinal scale. The expected value may be approximately equal to the nominal resolution. The memory may have an operating system, with a operating system registry and an operating system interface and the method might further include saving the adjusted resolution in the operating system registry through the operating system interface, for reuse. The step of determining a measured value by overlaying the first pattern with the second pattern to determine a measured value may include placing a first end of the first pattern next to a first end of the second pattern, and reading a measured value as a number from a scale on the second pattern at a point where a second end of the first pattern meets the second pattern.

The present invention also provides for a method for calibrating the longitudinal accuracy of a well log printer having a nominal resolution which includes sending a request to print calibration patterns to a calibration program in a memory of a data acquisition and processing software, determining by the calibration program an expected value and a default nominal resolution, based on the type of well log printer, checking by the calibration program in an operating registry, through an operating interface of an operating system for the data acquisition and processing equipment, for a stored value for the nominal resolution and if there is a stored value, discarding the default nominal resolution in favor of the stored value, sending the nominal resolution to a rendering software in the data acquisition and processing software, formatting a first pattern in a transverse direction of a well log and a second pattern, having a numerical scale having numbers, in the longitudinal direction of the well log, printing and separating the first pattern and the second pattern, placing a first end of the first pattern next to a first end of the second pattern, ascertaining a measured value as a number from the numerical scale on the second pattern at a point where a second end of the first pattern meets the second pattern, inputting the measured value into the data acquisition and processing software, and determining by the calibration program an adjusted nominal resolution by multiplying the nominal resolution by the ratio of the measured value to an expected value. This method may also include re-formatting and printing the first pattern and the second pattern using the adjusted nominal resolution or re-formatting and printing the log using the adjusted nominal resolution. It may also include saving the adjusted nominal resolution in the operating system registry for reuse.

The present invention also provides for an apparatus for calibrating the longitudinal accuracy of a marking device which includes a means for printing a first pattern in a transverse direction and a second pattern in a longitudinal direction, a means for ascertaining a measured value by comparing the first pattern to the second pattern, and an adjusting means for using the measured value to adjust the longitudinal scale. The means for printing the first pattern and the second pattern may be a strip chart recorder, a printer, a well log printer or any other marking device.

The present invention also provides for an apparatus for calibrating the longitudinal accuracy of a well log printer which includes a means for printing a first pattern in a transverse direction and a second pattern in a longitudinal direction of a well log, a measured value determined by comparing the first pattern to the second pattern, and a means for inputting the measured value into a means for adjusting the longitudinal scale responsive to the measured value. The inputting means may be a keyboard. The means for adjusting the longitudinal scale may include a means for calculating a compensation factor by taking the ratio of the measured value to an expected value, a means for adjusting the nominal resolution responsive to the compensation factor to determine an adjusted resolution, and a means for rendering the well log using the adjusted resolution, which yields an adjusted longitudinal scale on the newly rendered well log. The apparatus may also include a storage means for storing the adjusted resolution for reuse.

The present invention also provides for a system for calibrating longitudinal accuracy of a well log printer, having a nominal resolution which includes a data acquisition and processing system with a memory for processing well log data into a log, the data acquisition and processing system having a memory, a printer for printing a first pattern in a transverse direction of the log and a second pattern in a longitudinal direction of the log, a measured value being determined by a visual comparison of the first pattern to the second pattern, an inputting means for inputting the measured value into the memory, and a resolution adjusting means in the memory for using the measured value to correct the longitudinal scale. The resolution adjusting means may include a calibration program for determining an adjusted resolution responsive to the measured value, and a rendering program to reformat the log responsive to the adjusted resolution. The system may also include an operating system in memory having an operating system registry for storage of the adjusted resolution for reuse and an operating system interface allowing other programs in memory access to the operating system registry. The inputting means may be a keyboard.

The present invention also provides for an apparatus for calibrating longitudinal accuracy of a well log printer which includes a data acquisition and processing software for processing well log data, a printer which accepts a signal from the rendering software and prints a first pattern in a transverse direction of a well log and a second pattern in a longitudinal direction of the well log, a measured value being determined by visually comparing the first pattern to the second pattern, a means for inputting the measured value in the data acquisition and processing software, a means in the data acquisition and processing software for adjusting the nominal resolution responsive to the measured value, and a rendering software in the data acquisition and processing software to reformat the well log responsive to the adjusted resolution, yielding an adjusted longitudinal scale. The means for inputting the measured value into the software may be a keyboard.

The present invention also provides for a method for calibrating the scaled accuracy of a marking device including comparing a first pattern marked in a first direction to a second pattern marked in a second direction, and adjusting a scale in the second direction in response to the comparison step.

The present invention also provides for an apparatus for calibrating the scaled accuracy of a marking device which includes a means for printing a first pattern in a first direction and a second pattern on a second direction, a means for ascertaining a measured value by comparing the first pattern to the second pattern, and an adjusting means for using the measured value to adjust the second direction.

An advantage of the present invention is it can be used with all brands and models of marking devices, printers, well log printers and print media.

Another advantage is that the present invention is relatively simple and convenient to use.

Another advantage of the present invention is that no external calibration standard is required.

Another advantage of the present invention is that calibration information, particularly for a particular printer type and medium, can be saved for future use.

DESCRIPTION OF THE PREFERRED EMBODIMENT

Figure 1:
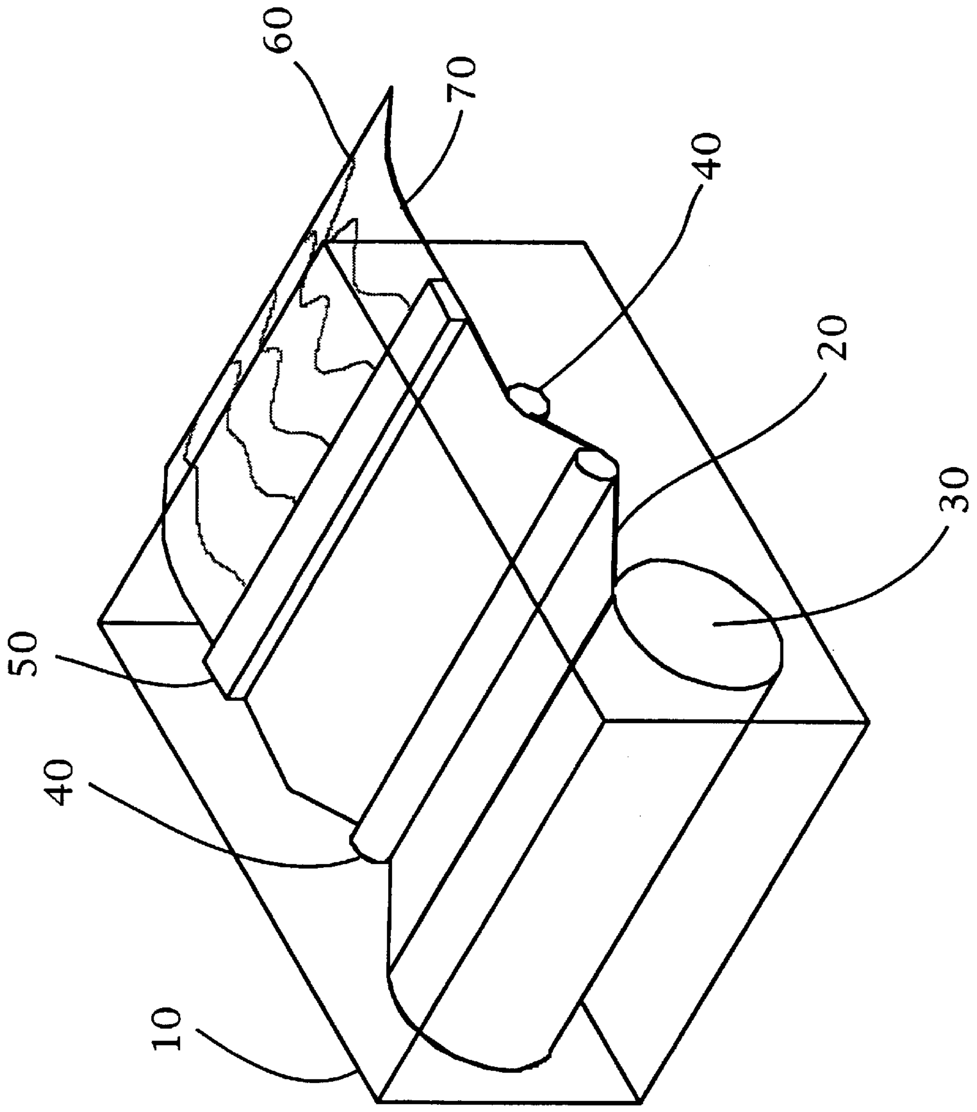
FIG. 1 PRIOR ART
FIG. 1 illustrates a well log printer.

The above-noted and other aspects of the present invention will become more apparent from a description of the preferred embodiment when read in conjunction with the accompanying drawings. The drawings, except for FIG. 1, FIG. 8 and FIG. 9 included for illustrative purposes only, illustrate the preferred embodiment of the invention. In the drawings, the same members have the same reference numerals.

FIG. 1 illustrates a typical well log printer 10. Printing medium 20 from a roll 30 of printing medium or log paper is threaded through a transport mechanism 40, to place the printing medium 20 in position for printing. In other embodiments, the printing medium supply may be fan folds or other forms of printing medium supply, instead of a roll. A plurality of fixed, or otherwise constrained, heads 50 print logging curves 60, depth (or other index) information, titles and other information on the printing medium 20, creating a log 70. Examples of such printers include Schlumberger's proprietary TGRP, CGRP and CIDP models, as well as commercially available models such as Printex model 820 DL and Gulton model 295.

Figure 2:
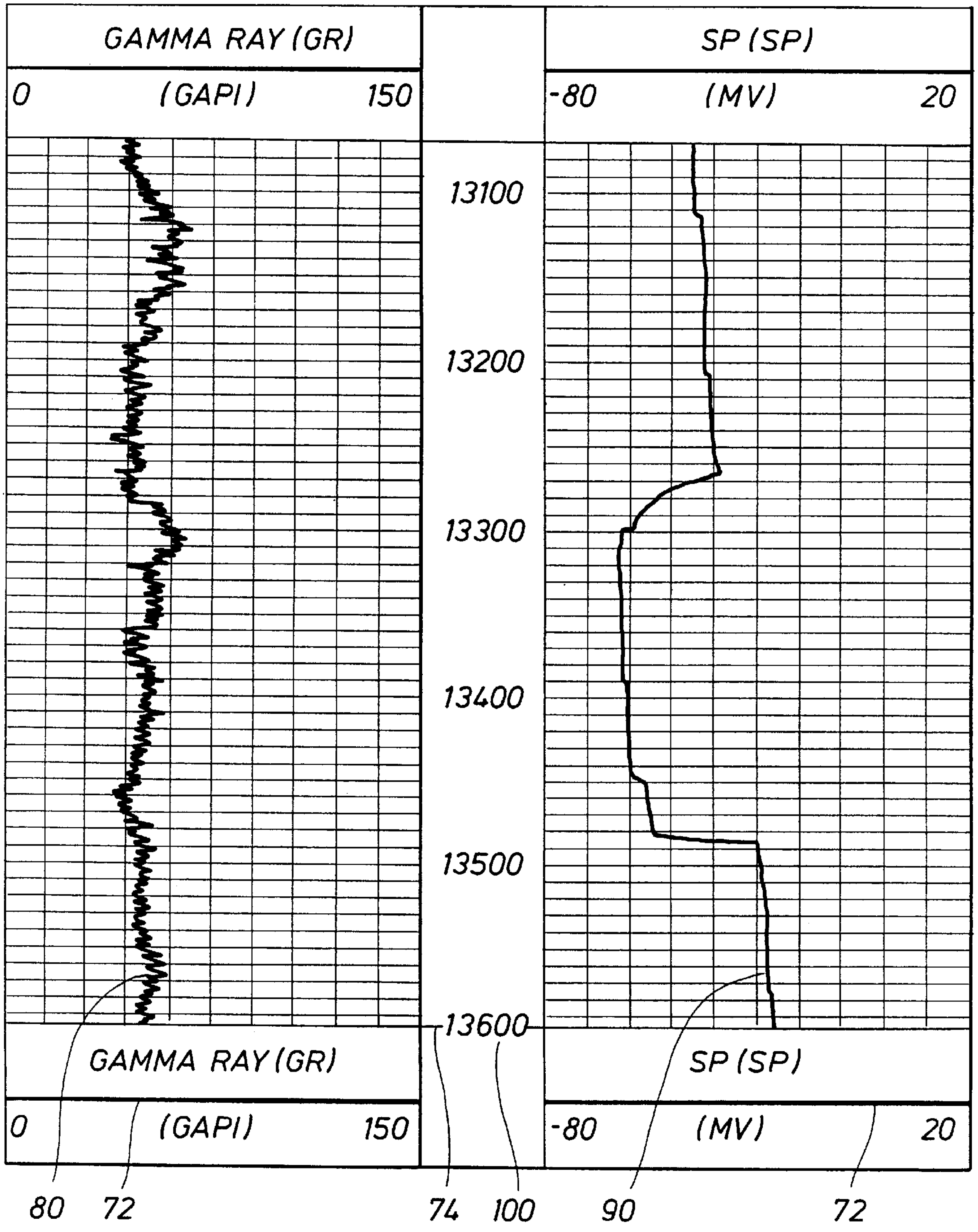
FIG. 2 and FIG. 3 each illustrate a log containing gamma ray and spontaneous potential curves printed to "one inch" scales.
Figure 3:
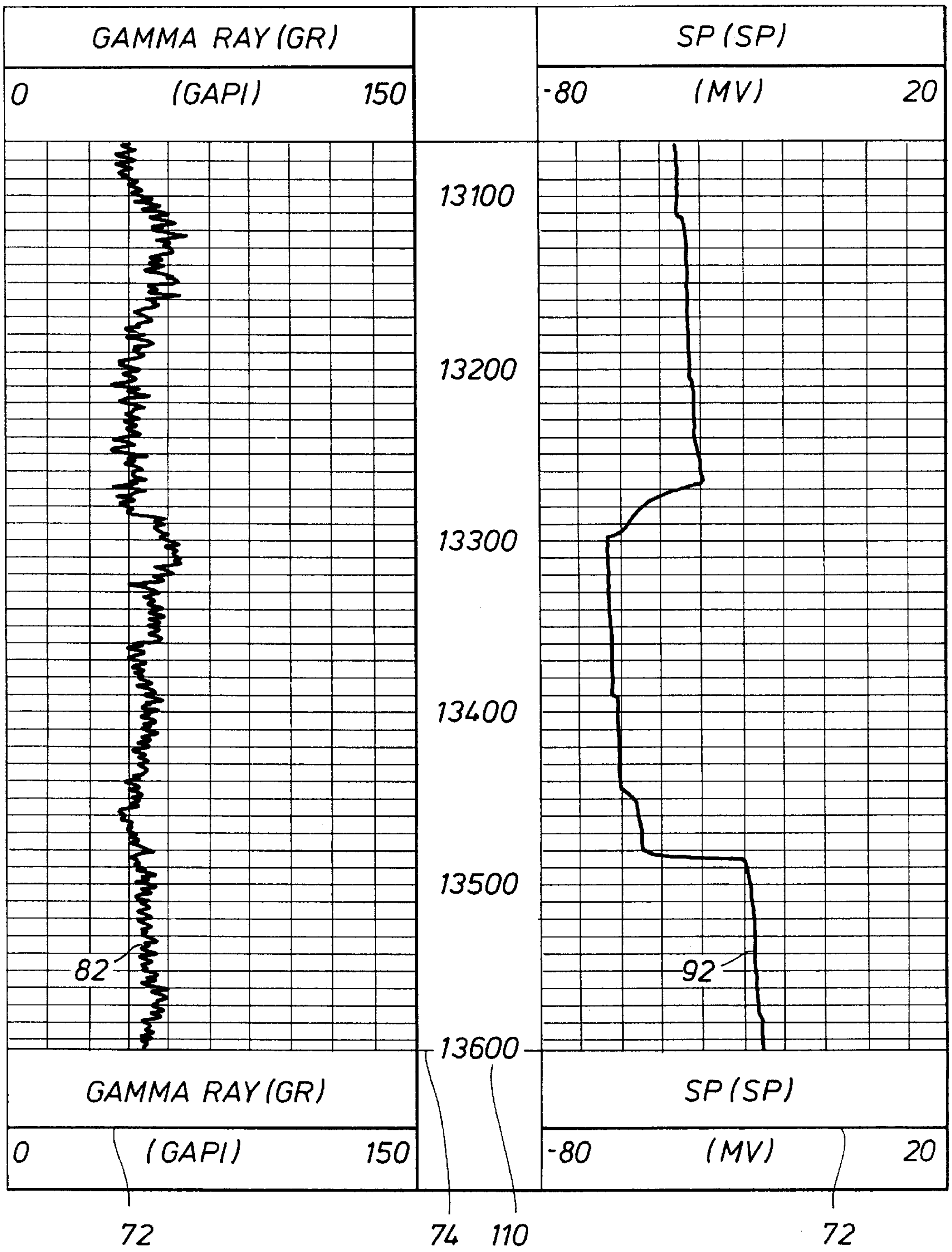

The log 70 includes both a transverse scale 72, in a transverse direction of the log 70, and a longitudinal scale 74, in a longitudinal direction of the log 70. FIG. 2 AND FIG. 3 each illustrate a printed log with gamma ray 80, 82 and spontaneous potential 90, 92 curves. Although both are printed to "one inch" longitudinal scales 74, the longitudinal scales 74 in the log in FIG. 3 are actually printed approximately five percent longer. Although the recorded numerical depths 100, 110, are correct with respect to the data shown in the log curves in both FIG. 2 AND FIG. 3, the differences in the way the logs were scaled and printed makes side-by-side comparison difficult.

A raster line is a row of dots deposited transversely by the printing heads 50. Printers print some number of raster lines per longitudinal inch of print medium. The number of lines printed defines the nominal longitudinal resolution of the printer. Typical nominal longitudinal resolutions for a well log printer are 192, 200, or 360 raster lines per inch of longitudinal printed medium. Sometimes, the printer uses resolutions for the transverse scale 72 and the longitudinal scale 74 which are different from each other.

Figure 4:
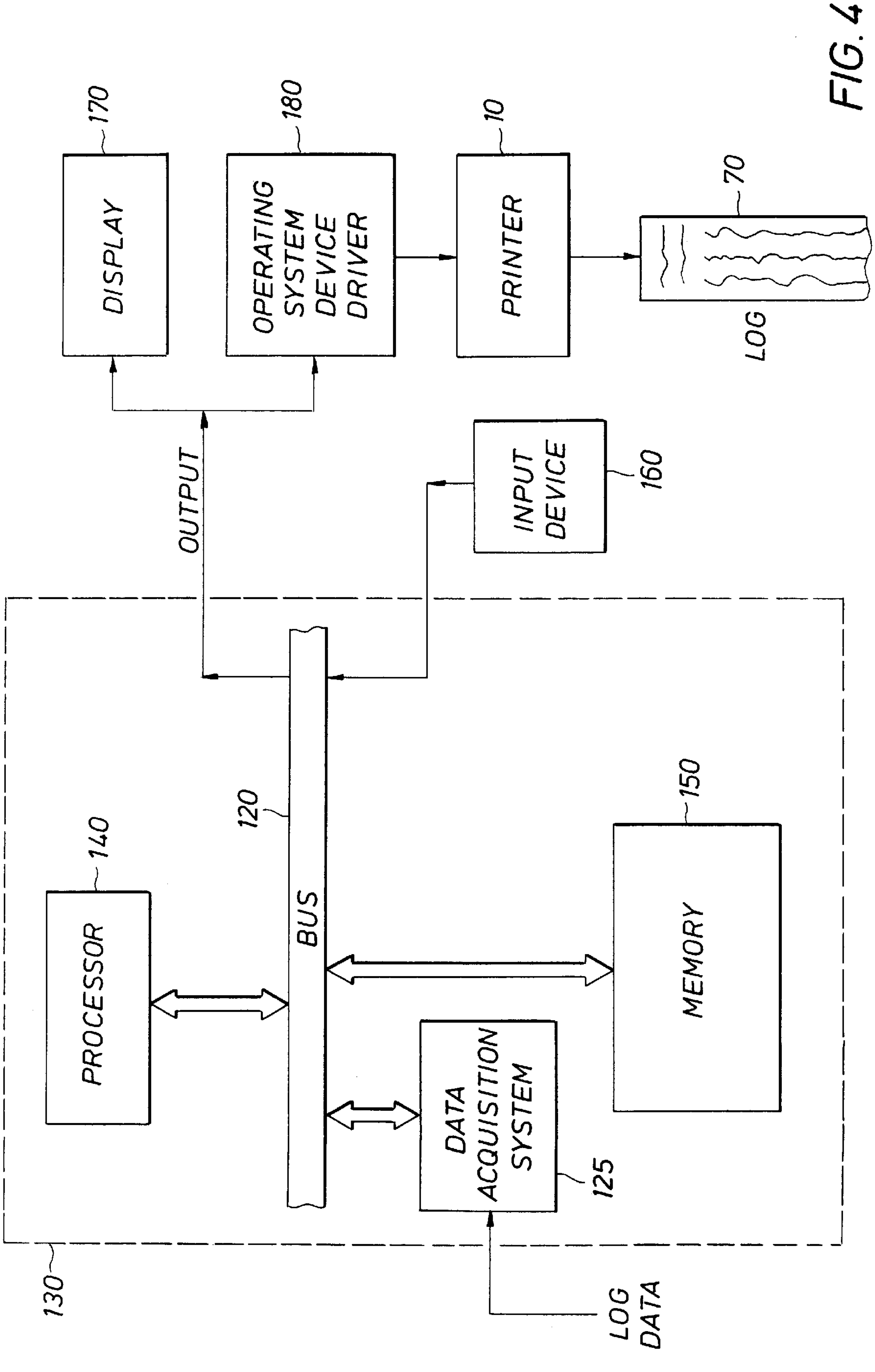
FIG. 4 illustrates the data acquisition and processing equipment, including various inputs and outputs.

Referring to FIG. 4, during logging operations, log data enters a bus 120 through a data acquisition system 125 in the data acquisition and processing equipment 130, which also includes a processor 140 and memory 150. A user can input information or software parameters into the data acquisition and processing equipment 130 using an input device 160, such as a keyboard. Output can be sent to a display 170 or an operating system device driver 180, which drives the printer 10, which in turn generates the log 70. The memory 150 may include both computer memory and disk memory.

Figure 5:
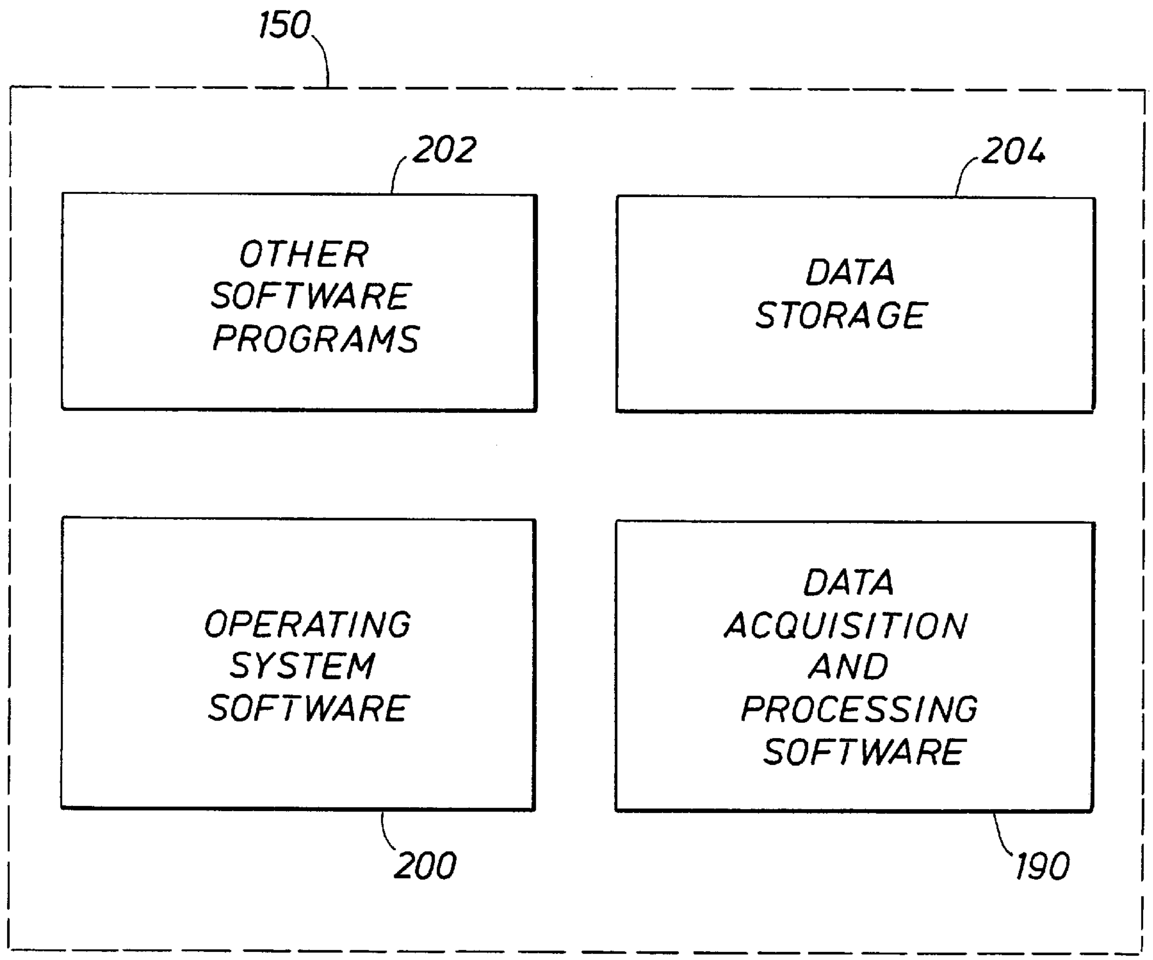
FIG. 5 illustrates the contents of memory of the data acquisition and processing equipment.

As illustrated in FIG. 5, the memory 150 contains a data acquisition and processing software 190, an operating system 200, preferably Windows® NT™ by Microsoft Corporation as well as other software 202 and a data storage 204. The operating system device driver 180, previously depicted in FIG. 4, is actually part of the operating system 200, as illustrated in FIG. 6.

Figure 6:
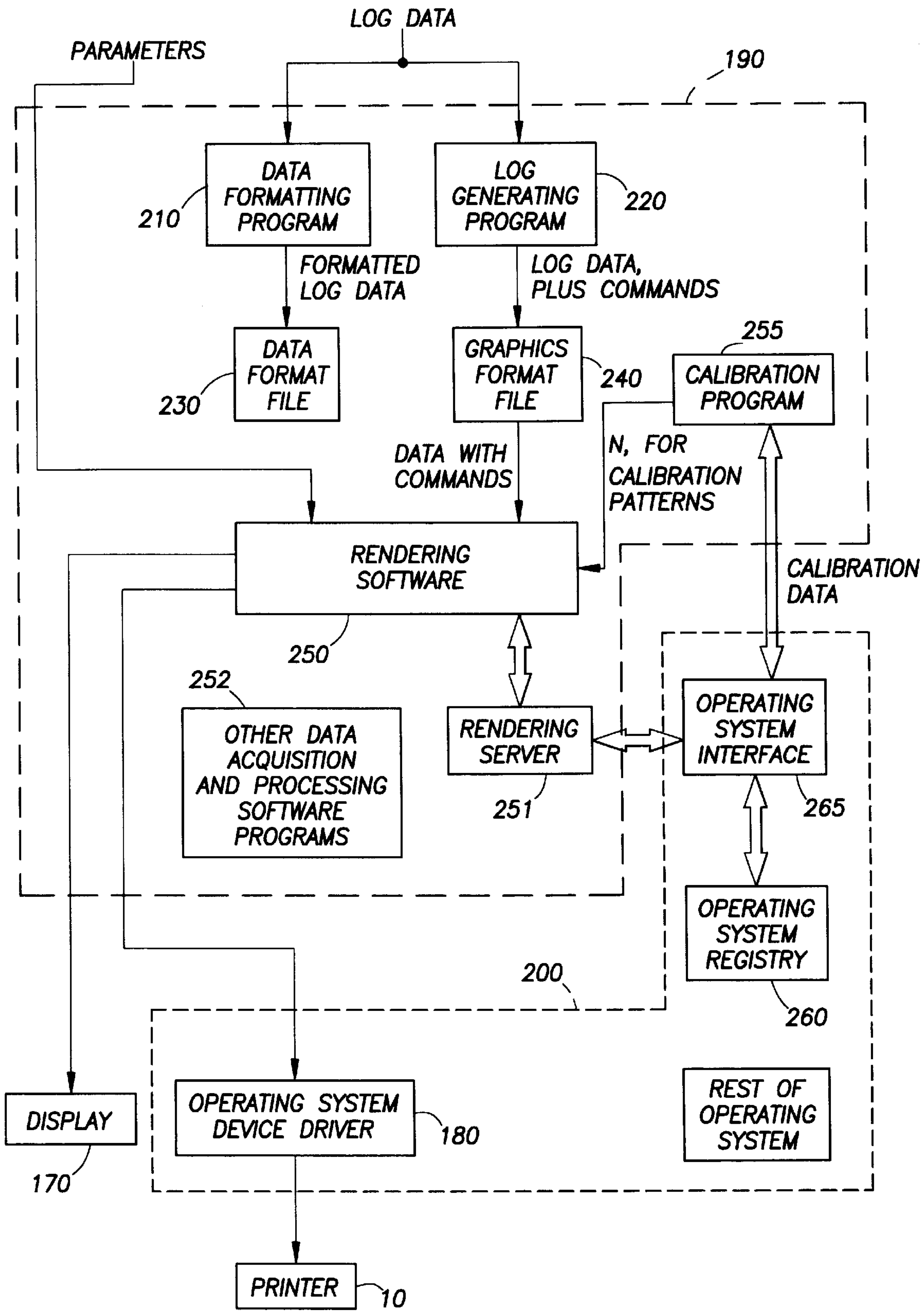
FIG. 6 illustrates a data acquisition and processing software and an operating system.

The data acquisition and processing software 190 may include a suite of computer programs as illustrated in FIG. 6. Examples of such software are known to those skilled in the art and include Schlumberger's proprietary MAXIS™ software. Log data comes into both a data formatting program 210 and a log generating program 220 in the data acquisition and processing software 190. The data formatting program 210 takes numerical data and formats it for storage in a data format file 230. The log generating program 220 uses a log description template to format the log data into a graphics format file 240, adding commands interspersed between the log data as it does so. As known to those of skill in the art, a rendering software 250 turns log data from the graphics format file 240 into rasters so the data can be printed, thereby "rendering" the data into a log. A rendering server 251 provides a function of a "traffic cop" for the rendering software 250 by transmitting print requests and parameters to the rendering software 250. Other data acquisition and processing software programs 252 are also included in the data acquisition and processing software 190.

Figure 7:
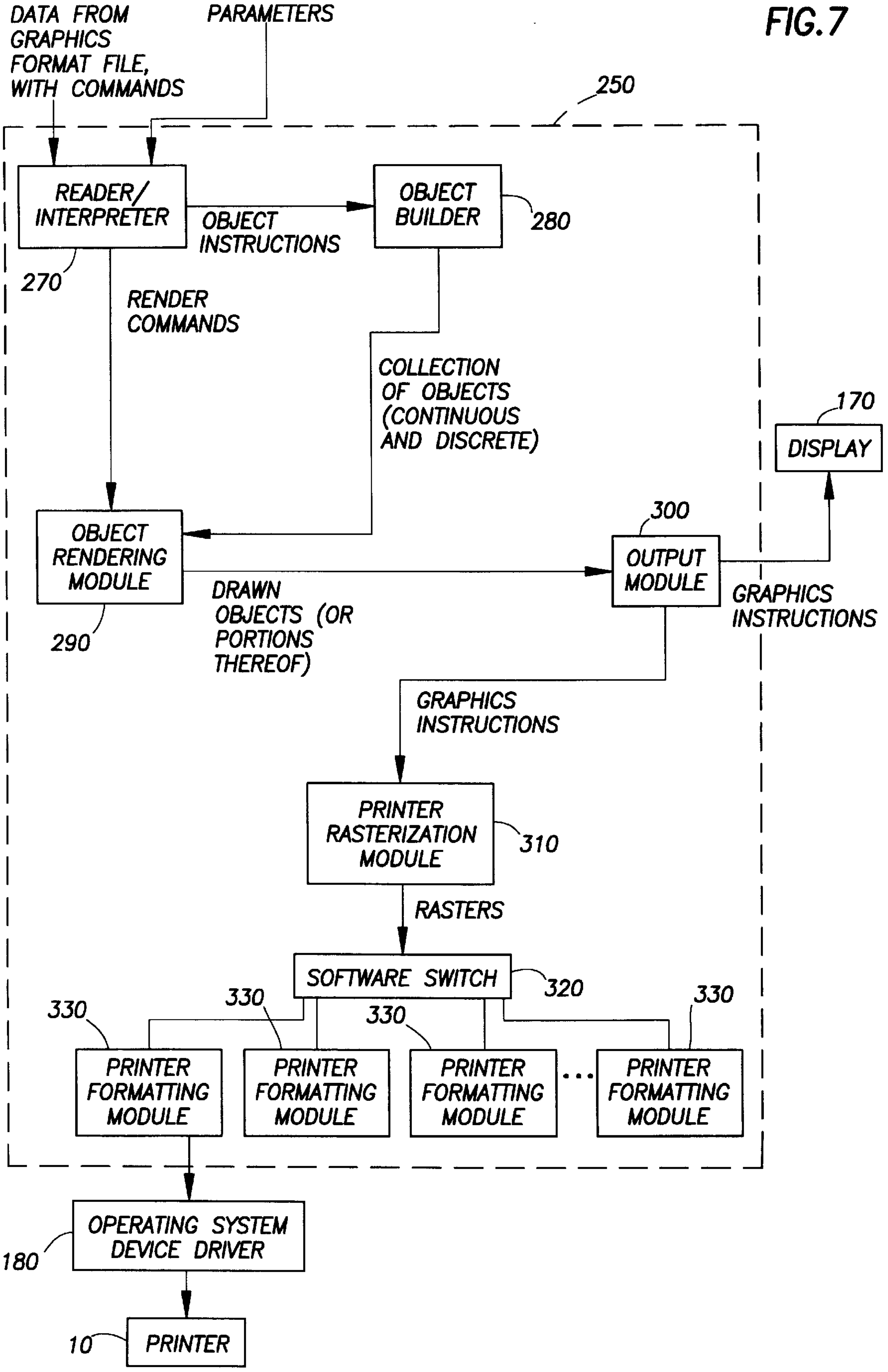
FIG. 7 illustrates a rendering software.

As illustrated in FIG. 7, the rendering software 250 includes a reader/interpreter 270, an object builder 280, an object rendering module 290, an output module 300, a printer rasterization module 310, a software switch 320, and printer formatting modules 330. In alternative embodiment, the rendering software 250 includes a reader and an interpreter rather than a reader/interpreter 270.

A well logging professional conducting a logging operation, or printing log data from format files, may input parameters through the input device 160 into the data acquisition and processing software 190 or the data acquisition and processing software 190 may itself derive or retrieve the parameters from memory. The parameters are sent through the data acquisition and processing software 190 and are input into the reader/interpreter 270 of the rendering software 250. The rendering software 250 uses the parameters to scale the data so that the correct number of raster lines are produced when the log is printed.

Continuing to refer to FIG. 7, data with commands from the graphics format file 240 also enters the reader/interpreter 270. From the data and the parameters, the reader/interpreter 270 creates object instructions, which it sends to the object builder 280. The object builder 280 constructs a collection of objects, each of which is either continuous or discrete, and sends these to the object rendering module 290. A numerical value on a log is an example of a discrete object; the logging curves, such as the gamma ray curve 80 shown in FIG. 2, are continuous objects. When the object rendering module 290 receives a render command from the reader/interpreter 270, the object rendering module 290 draws objects, or portions of objects, and sends them to the output module 300. The output module 300 reduces the drawn objects into a sequence of graphics instructions, which it sends to either the display 170 or a printer rasterization module 310. The printer rasterization module 310 may be connected through a software switch 320, such as a dispatch table, to any one of a wide variety of printer formatting modules 330. Each printer formatting module 330 formats the rasters for a particular printer 10 and sends the formatted rasters to the appropriate printer 10 through an operating system device driver 180.

Referring back to FIG. 6, a calibration program 255 provides calibration data to an operating system registry 260 of the operating system 200, through an operating system interface 265. Both the calibration program 255 and the rendering server 251 can access the calibration data in the operating system registry 260 to send to the rendering software 250 for use in printing a test pattern or rendering the log, respectively. The calibration data includes a longitudinal nominal resolution for the printer 10. If the rendering software 250 has no other value for the nominal resolution, the rendering software 250 has default values it can use.

Figure 8:
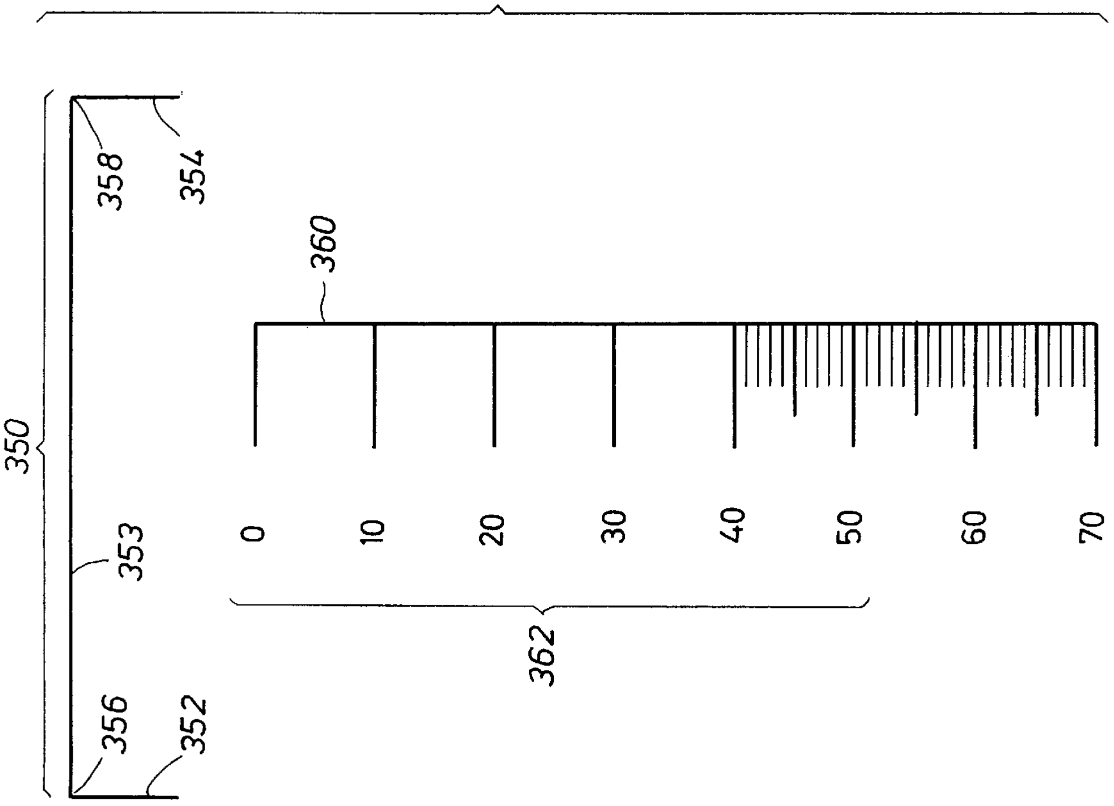
FIG. 8 illustrates a printed transverse pattern and a printed longitudinal pattern.

The calibration of the printer 10 begins with printing two calibration patterns, a transverse pattern 350 and a longitudinal pattern 360, as illustrated in FIG. 8. The printed transverse pattern 350 has a crossbar 353 and first and second arms 352, 354 at its first and second ends 356, 358 respectively. The arms 352, 354 may or may not extend past the crossbar 353, as a matter of personal preference. The printed longitudinal pattern 360 includes a numerical pattern 362 which starts at 0 at a first end 364 of the longitudinal pattern 360 and increases at regularly spaced intervals. The well logging professional separates the printed media between the printed transverse pattern 350 and the printed longitudinal pattern 360 or, alternatively, can print one pattern first, tear or cut it off and then print the remaining pattern.

Figure 9:
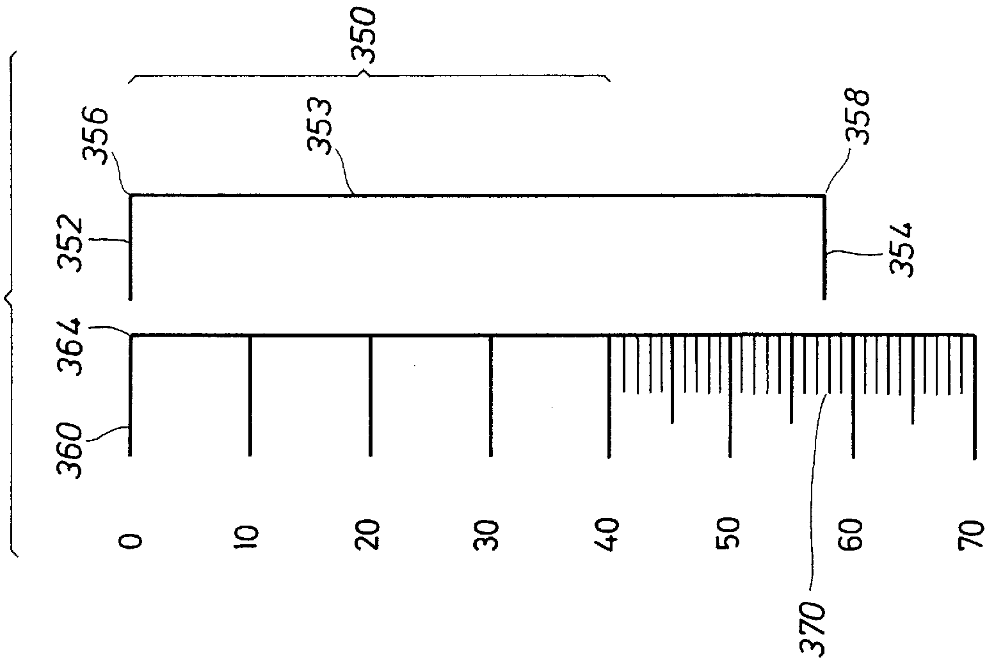
FIG. 9 illustrates the juxtaposition of the printed transverse pattern and the printed longitudinal pattern for comparison.

As illustrated in FIG. 9, the printed transverse pattern 350 and the printed longitudinal pattern 360 are aligned or overlaid so that the first end 356 of the transverse pattern 350 matches up with the first end 364 of the printed longitudinal pattern 360. The arm 354 at the second end 358 of the printed transverse pattern 350 will then match up with a specific measured value 370 on the printed longitudinal pattern 360. In the example depicted in FIG. 9, the measured value 370 is 58. FIG. 8 and FIG. 9 are included for illustrative purposes only. Preferred embodiments of the transverse pattern 350 and a longitudinal pattern 360, with numerical patterns 362 appropriate for typical resolutions of printers, are illustrated in FIG. 10 and FIG. 11.

Figure 10:
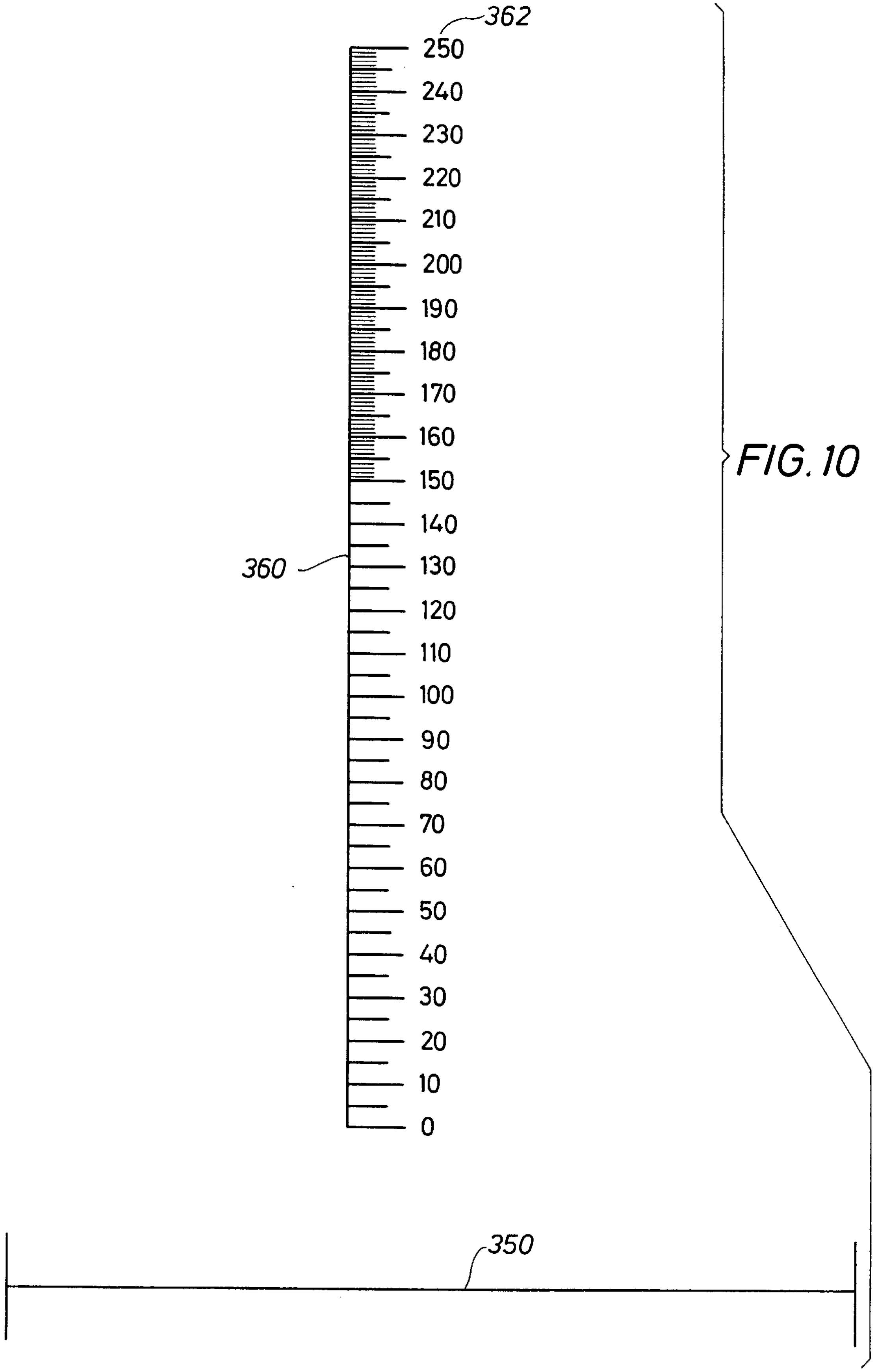
FIG. 10 illustrates a preferred embodiment of the printed transverse pattern and the printed longitudinal pattern for printers with a nominal longitudinal resolution of 200 raster lines per inch and with the longitudinal pattern printed with appropriate numerical patterns, all scaled by 75%.
Figure 11:
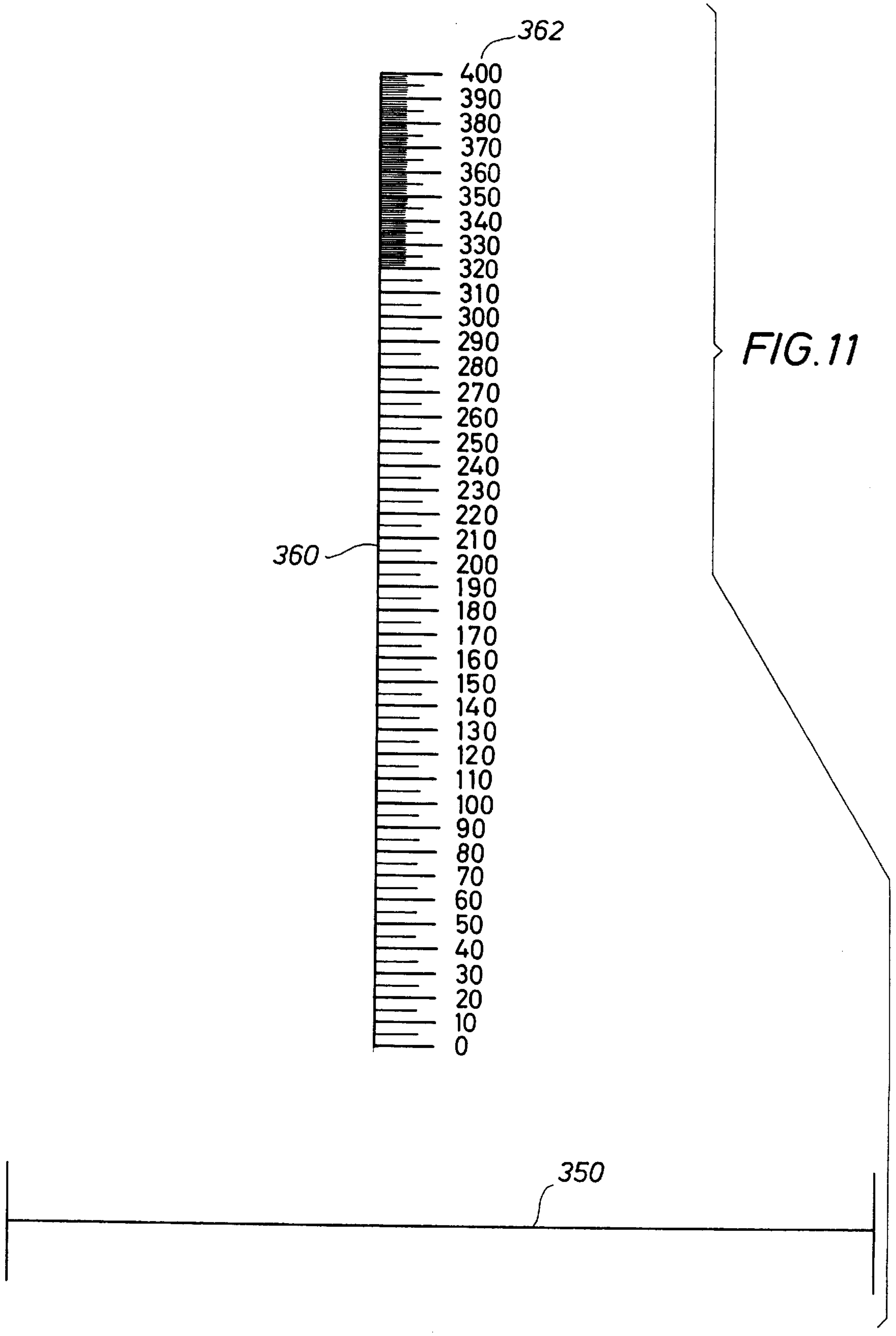
FIG. 11 illustrates a preferred embodiment of the printed transverse pattern and the printed longitudinal pattern for printers with a nominal longitudinal resolution of 360 raster lines per inch and with the longitudinal pattern printed with appropriate numerical patterns, all scaled by 75%.

FIG. 10 illustrates a preferred embodiment of the printed transverse pattern 350 and the printed longitudinal pattern 360, with a nominal longitudinal resolution of 200 raster lines per inch and with the longitudinal pattern 360 printed with appropriate measured values, all scaled by 75%. FIG. 11 illustrates another preferred embodiment of the printed transverse pattern 350 and the printed longitudinal pattern 360, with a nominal longitudinal resolution of 360 raster lines per inch and with the longitudinal pattern 360 printed with appropriate measured values, all scaled by 75%.

Figure 12:
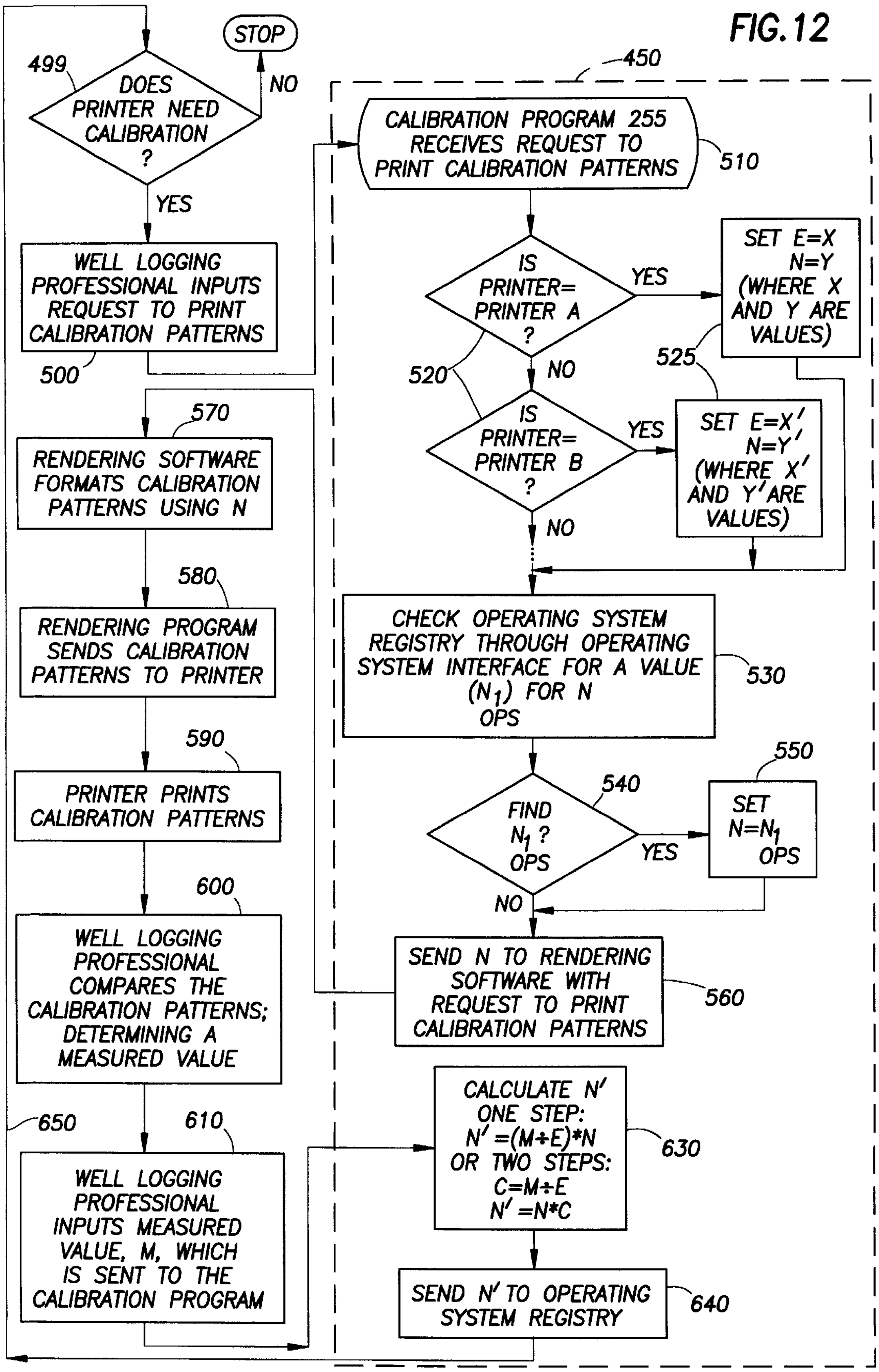
FIG. 12 illustrates a process of calibrating and adjusting a nominal resolution and a longitudinal scale.

Referring to FIG. 12, the dashed box 450 encloses functions performed by the calibration program 255. If a calibration is desired 499, the well logging professional inputs 500 a request to print calibration patterns, that is, the transverse pattern 350 and the longitudinal pattern 360. The calibration program 255 receives this request 510, determines 520 what printer is being used and selects 525 values for the expected value (E) and for the nominal resolution, N, of the printer 10 accordingly. The calibration program 255 then checks 530 the operating system registry 260 of the operating system 200, through the operating system interface 265 for a stored value of the nominal resolution. If the calibration program 255 finds 540 the stored value, the calibration program 255 sets 550 the nominal resolution to the stored value from the operating system registry 260. If there is none, the calibration program 255 does not change the value of the nominal resolution. The calibrating program 255 then sends 560 the nominal resolution and the request to the rendering software 250. The rendering software 250 formats 570 the transverse pattern 350 and the longitudinal pattern 360 using the nominal resolution and sends 580 the transverse and longitudinal patterns to the printer 10, as described above. The printer 10 prints 590 the transverse pattern 350 and the longitudinal pattern 360.

Continuing to refer to FIG. 12, after the printer 10 prints the transverse pattern 350 and the longitudinal pattern 360 using the printer's nominal resolution, the well logging professional compares 600 the transverse pattern 350 to the longitudinal pattern 360 and determines the measured value 370. The well log professional inputs 610 this measured value 370 using the input device 160 into the data acquisition and processing equipment 130. The measured value 370 is sent to the calibration program 255 in the data acquisition and processing software 190 so that the measured value 370 can be used to adjust the longitudinal scale 74 to compensate for printer variations or error.

In the calibration program 255, a compensation factor may be calculated as a ratio of the measured value 370 to an expected value. The expected value may be arbitrarily chosen, and the printed transverse pattern 350 and the printed longitudinal pattern 360 designed accordingly so that the optimal measured value 370 would equal the chosen expected value. But for good results, the chosen expected value should be chosen as close as possible to the nominal resolution of the printer 10. Preferably, the expected value should be set equal to the nominal resolution of the printer 10. If the expected value were chosen in the preferable manner and the printer 10 was perfectly calibrated, both the nominal resolution and the expected value would equal the measured value 370.

The calibration program 255 redefines 630 the effective resolution associated with the printer 10 to an adjusted resolution N', in terms of the nominal resolution N. This can be done in either two steps, starting with the determination of the compensation factor as described above or it may be done in one step. The formulae are as follows:

Using a two step method:

$$N' = N \cdot C, \qquad \text{EQ. 1}$$

where:

N' is the adjusted resolution,

N is the nominal resolution, and

C is the compensation factor, and where $$C = M/E, \qquad \text{EQ. 2}$$

where:

M is the measured value 370 and

E is the expected value.

Alternatively, and preferably, N' can be calculated in one step:

$$N' = (M/E) \cdot N \qquad \text{EQ. 3}$$

The calibration program 255 sends 640 the value for N' to the operating system registry 260, from which it can be retrieved either by the calibration program 255 to send to the rendering software 250 for use in printing calibration patterns or by the rendering server 251 to send to the rendering software 250 for use in rendering the log 70 with an adjusted longitudinal scale 74.

The calibration patterns 350, 360 may be re-printed using the adjusted resolution. If necessary, the steps outlined above could be repeated 650 to ensure an accurately printed longitudinal scale.

In an alternative embodiment of the invention, the physical configuration of the printer 10 could be adjusted in accordance with the measured value 370 to adjust the printed longitudinal scale 74.

In another alternative embodiment of the present invention, the measurements could be made on the transverse scale 72 rather than the longitudinal scale 74, and EQ. 1 would use a multiplicative inverse of C, rather than C and EQ.3 would become N'=(E/M)·N.

In another alternative embodiment of the present invention, values for the expected value and the nominal resolution could be kept in data storage in the memory or in the operating system registry instead of being intrinsic to the calibration program.

The present invention can be used in data service centers, data print centers, offices, or anywhere printing takes place, as well as in logging trucks or units in a wellsite environment. The log data may be stored in and reprinted from memory in such situations.

In another alternative embodiment, instead of a well log printer, the present invention could be applied to a marking device, strip chart recorder, or any other marking device where one scale or printing axis is less subject to variation than another. The marking device is not required to use either raster lines or fixed heads. The present invention can be used with a marking device which uses, for example, one of the following: a laser marking engine, a movable pen, a movable head ink jet system, a pen with a movable paper transport or other marking mechanisms.

It may be advantageous to use the adjusted resolution determined for a specific well log printer and printing medium the next time this printer and medium are used again. The adjusted resolution may be saved for re-use, either manually or in the memory. Preferably, the adjusted resolution is saved in memory, such as the operating system registry, in association with the particular medium and printer used. The industry professional could re-use the last-saved adjusted resolution for a specific medium and printer by simply specifying the medium and/or printer. Alternatively, either the compensation factor or the measured value could be thus saved and re-used.

The benefits of the present invention include ease of use and convenience. Another benefit is that the invention may be used with any kind of printer or medium. Yet another benefit is that no external means of calibration is needed for the invention.

The principles, preferred embodiments, and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention.

What is claimed is:

1. A method for calibrating the longitudinal accuracy of a well log printer having a nominal resolution comprising:

a.) printing on the well log printer a first pattern in a transverse direction of a well log;

b.) printing on the well log printer a second pattern having a numerical pattern in a longitudinal direction of the well log;

c.) determining a measured value from the numerical pattern by comparing the first pattern to the second pattern; and d.) adjusting a scale in the longitudinal direction using the measured value.

2. A method for calibrating the longitudinal accuracy of a well log printer as in claim 1, wherein the comparing in the determining step is performed visually.

3. A method for calibrating the longitudinal accuracy of a well log printer as in claim 1, wherein the well log printer has an expected value and the adjusting step includes:

inputting the measured value into a calibration program;

determining by the calibration program a compensation factor by taking a ratio of the measured value to an expected value;

determining by the calibration program an adjusted resolution by multiplying the nominal resolution by the ratio; and formatting the well log using the adjusted resolution, yielding an adjustment of the scale in the longitudinal direction.

4. A method for calibrating the longitudinal accuracy of a well log printer as in claim 1, wherein the well log printer has an expected value and the adjusting step includes:

inputting the measured value into a calibration program;

determining by the calibration program an adjusted resolution by multiplying the nominal resolution by a ratio of the measured value to the expected value; and formatting the well log using the adjusted resolution, yielding an adjustment of the scale in the longitudinal direction.

5. A method for calibrating the longitudinal accuracy of a well log printer as in claims 3 or 4, further comprising:

saving the adjusted resolution.

6. A method for calibrating the longitudinal accuracy of a well log printer as in claim 1, wherein the well log printer has an expected value and the step of adjusting the scale in the longitudinal direction using the measured value includes:

inputting the measured value into a data processing system having memory;

using first software in the memory to compute a compensation factor by taking a ratio of the measured value to the expected value; and using the first software to adjust the nominal resolution of the printer by the compensation factor; and inputting the adjusted resolution into a second software to adjust the scale in the longitudinal direction of the well log.

7. A method for calibrating the longitudinal accuracy of a well log printer as in claim 6, further comprising:

saving the adjusted resolution in memory.

8. A method for calibrating the longitudinal accuracy of a well log printer as in claim 6, wherein:

the expected value is approximately equal to the nominal resolution.

9. A method for calibrating longitudinal accuracy of a well log printer having a nominal resolution comprising:

a.) printing on the well log printer a first pattern in a transverse direction of a well log;

b.) printing on the well log printer a second pattern in a longitudinal direction of the well log;

c.) overlaying the first pattern with the second pattern to determine a measured value; and d.) adjusting a scale in the longitudinal direction using the measured value.

10. A method for calibrating the longitudinal accuracy of a well log printer as in claim 9, wherein:

the step of adjusting the scale in the longitudinal direction using the measured value includes:

inputting the measured value into a data acquisition and processing system, having a memory, the memory having a rendering program and a calibration program;

determining an adjusted resolution by the calibration program taking the ratio of the measured value to an expected value and adjusting the nominal resolution by the ratio; and rendering the well log with the adjusted resolution by the rendering program, yielding an adjustment of the scale in the longitudinal direction.

11. A method for calibrating the longitudinal accuracy of a well log printer as in claim 10, wherein the expected value is approximately equal to the nominal resolution.

12. A method for calibrating the longitudinal accuracy of a well log printer as in claim 11, further comprising the memory having an operating system, the operating system having a operating system registry and an operating system interface and further comprising:

saving the adjusted resolution in the operating system registry through the operating system interface.

13. A method for calibrating the longitudinal accuracy of a well log printer as in claim 10, wherein:

the step of determining a measured value by overlaying the first pattern with the second pattern includes: placing a first end of the first pattern next to a first end of the second pattern; and reading a measured value as a number from a numerical scale on the second pattern at a point where a second end of the first pattern meets the second pattern.

14. A method for calibrating the longitudinal accuracy of a well log printer having a nominal resolution comprising:

a.) sending a request to print test patterns to a calibration program in a memory of a data acquisition and processing software;

b.) determining by the calibration program an expected value and a default nominal resolution, based on the well log printer type;

c.) checking by the calibration program of an operating registry, through an operating interface of an operating system for the data acquisition and processing software, for a stored value for the nominal resolution and if there is a stored value, discarding the default nominal resolution in favor of the stored value;

d.) sending the nominal resolution to a rendering software in the data acquisition and processing software;

e.) formatting a first pattern in a transverse direction of a well log and a second pattern, having a numerical scale having numbers, in the longitudinal direction of the well log;

f.) printing and separating the first pattern and the second pattern;

g.) placing a first end of the first pattern next to a first end of the second pattern;

h.) ascertaining a measured value as a number from the numerical scale on the second pattern at a point where a second end of the first pattern meets the second pattern;

i.) inputting the measured value into the data acquisition and processing software; and j.) determining by the calibration program an adjusted nominal resolution by adjusting the nominal resolution by a ratio of the measured value to an expected value.

15. A method for calibrating the longitudinal accuracy of a well log printer as in claim 14, further comprising:

re-formatting and printing the first pattern and the second pattern using the adjusted nominal resolution.

16. A method for calibrating the longitudinal accuracy of a well log printer as in claim 14, further comprising:

re-formatting and printing the log using the adjusted nominal resolution, yielding an adjustment of the scale in the longitudinal direction.

17. A method for calibrating the longitudinal accuracy of a well log printer as in claim 14, further comprising:

saving the adjusted nominal resolution in the operating system registry.

18. An apparatus for calibrating the longitudinal accuracy of a well log printer comprising:

a.) a means for operating the well log printer to print a first pattern in a transverse direction of a well log;

b.) a means for operating the well log printer to print a second pattern in a longitudinal direction of the well log;

c.) a measured value determined by comparing the first pattern to the second pattern;

d.) a means for inputing the measured value into a means for adjusting a scale in the longitudinal direction responsive to the measured value.

19. An apparatus for calibrating the longitudinal accuracy of a well log printer according to claim 18, wherein the inputting means comprises a keyboard.

20. An apparatus for calibrating the longitudinal accuracy of a well log printer according to claim 18, wherein the means for adjusting the scale in the longitudinal direction includes:

a means for taking a ratio of the measured value to an expected value;

a means for adjusting the nominal resolution responsive to the ratio to determine an adjusted resolution; and a means for rendering the well log using the adjusted resolution, which yields an adjustment of the scale in the longitudinal direction on the newly-rendered well log.

21. An apparatus for calibrating the longitudinal accuracy of a well log printer according to claim 20, further comprising:

a storage means for storing the adjusted resolution for reuse.

22. A system for producing well logs having calibrated longitudinal accuracy, on a marking device, having a nominal resolution comprising:

a.) a data acquisition and processing system, having a memory, for processing well log data into a log;

b.) a printer, connected to the data acquisition system, for printing a first pattern in a transverse direction of the log and a second pattern in a longitudinal direction of the log;

c.) an inputting means for receiving a measured value determined by a visual comparison of the first pattern to the second pattern and for inputting the measured value into the memory;

d.) a resolution adjusting means in the memory for using the measured value to adjust the nominal resolution to obtain an adjusted resolution; and e.) a means for adjusting a scale in the longitudinal direction responsive to the adjusted resolution.

23. A system for calibrating longitudinal accuracy of a well log printer according to claim 22, wherein the resolution adjusting means includes:

a calibration program for determining an adjusted resolution responsive to the measured value.

24. A system for calibrating longitudinal accuracy of a well log printer according to claim 23, wherein the means for adjusting the longitudinal scale includes:

a rendering program to reformat the log responsive to the adjusted resolution.

25. A system for calibrating longitudinal accuracy of a well log printer according to claim 24, further comprising:

an operating system in the memory having an operating system registry for storage of the adjusted resolution and an operating system interface for allowing other programs in the memory access to the operating system registry.

26. A system for calibrating longitudinal accuracy of a well log printer according to claim 23, wherein the inputting means comprises a keyboard.

* * * * *